US008312863B2

(12) United States Patent
Ibrahim et al.

(10) Patent No.: US 8,312,863 B2

(45) Date of Patent: Nov. 20, 2012

(54) FUEL DELIVERY SYSTEM FOR SELECTIVELY PROVIDING FUEL TO VARIOUS ENGINE COMPONENTS

(75) Inventors: Daniel R. Ibrahim, Metamora, IL (US); Ye Tian, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 247 days.

(21) Appl. No.: 12/722,208

(22) Filed: Mar. 11, 2010

(65) Prior Publication Data

US 2011/0219751 A1 Sep. 15, 2011

(51) Int. Cl.
*F01N 3/00* (2006.01)

(52) U.S. Cl. ............. 123/446; 417/326; 60/286; 60/295

(58) Field of Classification Search .................. 123/446, 123/447, 495, 497; 417/326; 60/282, 286, 60/303, 305

See application file for complete search history.

(56) References Cited

U.S. PATENT DOCUMENTS 4,482,301 A * 11/1984 Schlick ......................... 417/317
4,565,170 A 1/1986 Grieshaber et al.
4,567,725 A 2/1986 Shinzawa et al.
4,589,254 A 5/1986 Kume et al.
4,651,524 A 3/1987 Brighton
5,165,371 A 11/1992 Wada et al.
5,534,161 A * 7/1996 Tarr et al. ...................... 210/744
5,572,974 A 11/1996 Wakeman
5,881,700 A * 3/1999 Gras et al. ..................... 123/520
6,058,912 A 5/2000 Rembold et al.
6,202,790 B1 * 3/2001 Oligmueller ...................... 184/6
6,536,217 B2 * 3/2003 Lipinski et al. ................. 60/772
6,834,496 B2 * 12/2004 Nakatani et al. ................ 60/274
6,913,002 B2 * 7/2005 Mashimo et al. ............. 123/520
7,252,070 B2 8/2007 Magel
7,654,080 B2 * 2/2010 Ripper et al. .................. 60/286
7,886,525 B2 * 2/2011 Nishibu et al. .................. 60/286
7,937,932 B2 * 5/2011 Hager et al. .................... 60/286
2004/0265179 A1 12/2004 Nelson et al.
2005/0247048 A1 * 11/2005 Schaller et al. ................. 60/286
2008/0034733 A1 2/2008 Miller et al.
2008/0035187 A1 2/2008 Brown et al.
2009/0301064 A1 * 12/2009 Maier et al. ..................... 60/286
2010/0024402 A1 * 2/2010 Bruhn et al. .................... 60/295
2010/0031930 A1 * 2/2010 Ibrahim et al. ................ 123/497
2010/0043409 A1 * 2/2010 Naydenov et al. .............. 60/287
2010/0071349 A1 * 3/2010 Kitazawa ........................ 60/277
2010/0319326 A1 * 12/2010 Haeberer et al. ................ 60/286

FOREIGN PATENT DOCUMENTS

JP 2006-233803 9/2006
JP 2008-101564 5/2008
WO 2008/090433 7/2008

* cited by examiner

*Primary Examiner* — Thomas Moulis

(74) *Attorney, Agent, or Firm* — Liell & McNeil

(57) ABSTRACT

A system for providing fuel to an engine fuel delivery system and to an exhaust aftertreatment system associated with an engine. The system includes a fuel source, a pump being operable in a first state to pump fuel from the fuel source to the engine fuel delivery system, and the pump being operable in a second state to pump fuel from the fuel source to the exhaust aftertreatment system, wherein the first state corresponds to a first rotational direction of the pump and the second state corresponds to a second rotational direction of the pump.

19 Claims, 2 Drawing Sheets

DIRECTION A
DIRECTION B
70
116
140
126
83
40
AFTERTREATMENT SYSTEM
124
35
138
120
136
127
55
ENGINE FUEL DELIVERY SYSTEM
132
146
130
144
122
50

FUEL DELIVERY SYSTEM FOR SELECTIVELY PROVIDING FUEL TO VARIOUS ENGINE COMPONENTS

TECHNICAL FIELD

The present disclosure relates to a fuel system, and, more particularly, to a fuel system including a pumping mechanism for selectively providing fuel to multiple remote components associated with the engine.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, exhaust emission standards have become more stringent. The amount of particulates and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few. In addition, engine manufacturers have developed devices for treatment of engine exhaust after it leaves the engine.

Engine manufacturers have employed exhaust aftertreatment devices called particulate traps to remove the particulate matter from the exhaust flow of an engine. A particulate trap may include a filter designed to trap particulate matter. The use of the particulate trap for extended periods of time, however, may enable particulate matter to accumulate on the filter, thereby causing the functionality of the filter and/or engine performance to decline.

One method of restoring the performance of a particulate trap may include regeneration. Regeneration of a particulate trap filter system may be accomplished by increasing the temperature of the filter and the trapped particulate matter above the combustion temperature of the particulate matter, thereby burning away the collected particulate matter and regenerating the filter system. This increase in temperature may be effectuated by various means. For example, some systems employ a heating element (e.g., an electric heating element) to directly heat one or more portions of the particulate trap (e.g., the filter material or the external housing). Alternatively, some systems may regenerate a filter system by utilizing fuel provided to the system. For example, an exothermic reaction may be created by providing fuel to a diesel oxidated catalyst, or the like. Still other systems may heat the exhaust gases upstream from the particulate trap, with the use of a fuel-fired burner that creates a flame within the exhaust conduit leading to the particulate trap. In this manner, the temperature of the exhaust gas is elevated to the point to promote regeneration of the diesel particulate filter.

In addition, in many engine applications, fuel priming is desired before the engine is started for full combustion. A priming pump may be disposed within an engine system between the fuel source and fuel transfer pump. Typically, a priming pump is used to remove air from the fuel system. Additionally, a priming pump may also be useful during fuel filter replacement events. Priming pumps may often be manually operated and consist of a plunger disposed within a barrel and selectively pump fuel from one check valve to another. When in use, an operator may have to manually reciprocate the plunger hundreds of times to properly prime the engine/new fuel filter.

It would be useful to have a single system to selectively provide fuel to an engine for priming purposes and to after-treatment systems that may require the use of fuel, such as a fuel-fired burner used to regenerate diesel particulate filter. The present disclosure is directed toward one or more of the aforementioned technologies.

SUMMARY

In one aspect, a system for delivering fluid from a common source to multiple locations. The system includes a fluid source. Also included is a pump associated with the fluid source, the pump being operable in a first state to pump fluid from the fluid source to a first location; and the pump being operable in a second state to pump fluid from the fluid source to a second location. The first state of the pump corresponds to a first rotational direction of the pump, and the second state of the pump corresponds to a second rotational direction of the pump.

In another aspect, a method of selectively providing fuel to an engine fuel delivery system and to an exhaust aftertreatment system, the method includes a step of providing a reversible pump associated with the engine fuel delivery system and the exhaust aftertreatment system. Another included step in the method is providing a fuel source fluidly connected to the reversible pump. A step of drawing fuel from the fuel source to the reversible pump is also included. The method also includes a step of selectively directing fuel from the pump to the engine fuel delivery system when the reversibly pump is operated in a first direction and to the exhaust aftertreatment system when the reversible pump is operated in a second direction.

In yet another aspect, a machine including an engine configured to generate a power output. The machine further includes an exhaust aftertreatment system associated with the engine. Also included is a fuel delivery system configured to selectively provide fuel to the engine and the exhaust aftertreatment system, the fuel delivery system further includes a fuel source. The fuel delivery system also includes a pump associated with the fuel source, the pump being operable in a first state to pump fuel from the fuel source to the engine, and the pump being operable in a second state to pump fuel from the fuel source to the regeneration system, wherein the first state corresponds to a first rotational direction of the pump and the second state corresponds to a second rotational direction of the pump.

DETAILED DESCRIPTION

Figure 1:
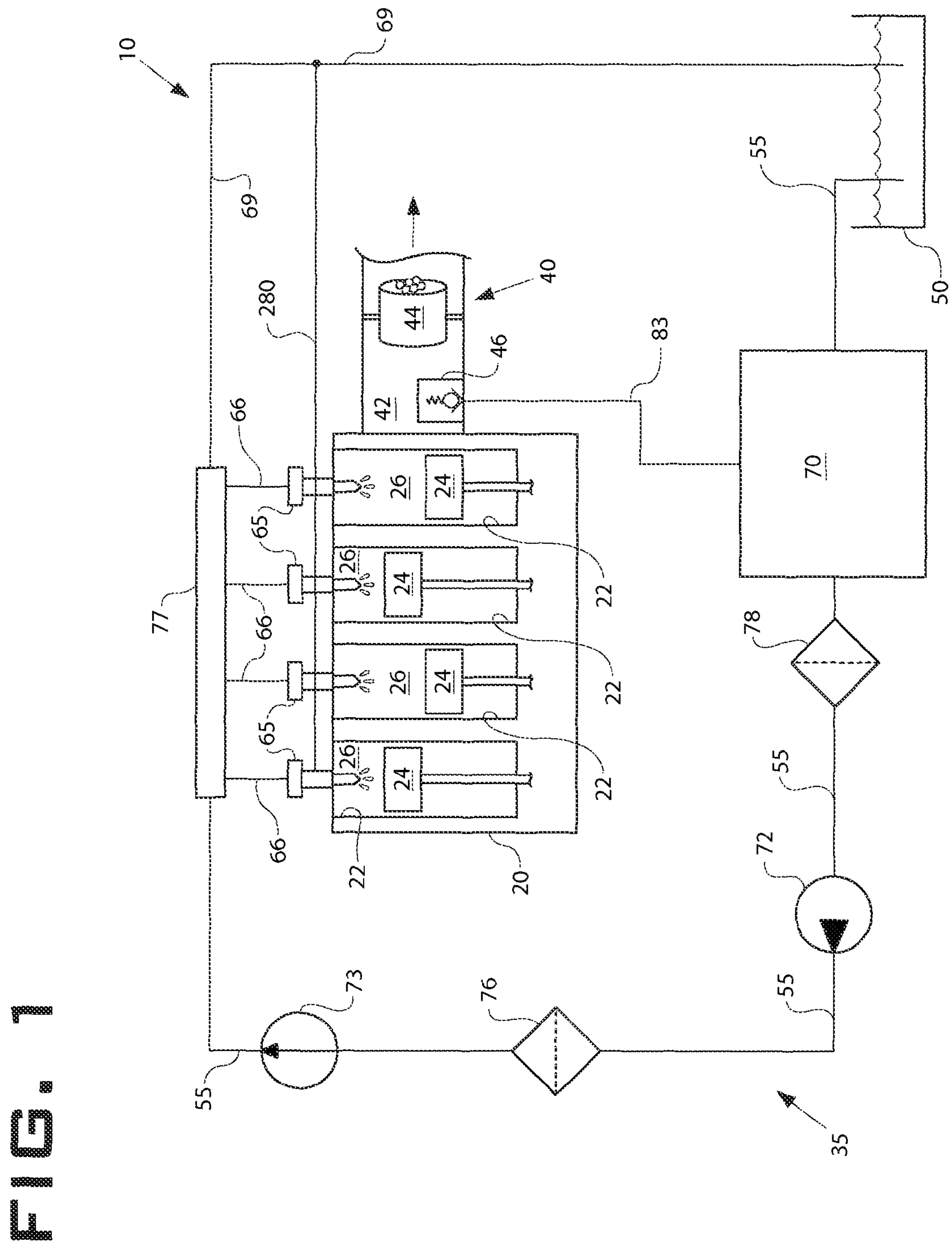
FIG. 1 is a schematic illustration of an exemplary disclosed power system.

An exemplary embodiment of a power system 10 is illustrated in FIG. 1. Power system 10 may include an internal combustion engine 20, an engine fuel delivery system 35, and an exhaust aftertreatment system 40. Internal combustion engine 20 may include one or more cylinders 22. For the purposes of this disclosure, internal combustion engine 20 is depicted and described as having four cylinders 22. One skilled in the art will recognize, however, that internal combustion engine 20 may include any suitable number of cylinders 22, and may be any type of combustion engine such as, for example, a gasoline, a diesel, or a gaseous fuel-powered engine.

Internal combustion engine 20 may also include a piston 24 slidably disposed within each cylinder 22. Each cylinder 22, together with each piston 24, may at least partially define a combustion chamber 26. One skilled in the art will readily recognize that combustion chamber 26 may be disposed in an “in-line” configuration, a “V” configuration, or in any other conventional configuration. Each piston 24 may be connected with a crankshaft (not shown) so as to reciprocate within combustion chamber 26.

Exhaust aftertreatment system 40 may include an exhaust passage 42 connected with internal combustion engine 20. It is contemplated that exhaust aftertreatment system 40 may include an exhaust manifold (not shown) in fluid communication with cylinders 22 to receive exhaust produced by internal combustion engine 20 and discharged from combustion chambers 26. The exhaust manifold may direct the exhaust to various devices of exhaust aftertreatment system 40 via exhaust passage 42.

Exhaust aftertreatment system 40 may include any number of aftertreatment or exhaust aftertreatment devices 44. Each exhaust aftertreatment device 44 may be configured to treat the exhaust from internal combustion engine 20. For example, one such exhaust aftertreatment device 44 may be a diesel particulate filter configured to remove diesel particulate matter from the exhaust. A fuel injection device 46 may be associated with the diesel particulate filter and be configured to inject and/or burn fuel to promote regeneration of the diesel particulate filter. Fuel may be injected into the exhaust flow upstream of exhaust aftertreatment device 44 during a regeneration event. Exhaust aftertreatment device 44 may alternatively embody a catalyst substrate configured to reduce exhaust constituents, such as NOx and/or SOx from the exhaust in the presence of fuel. In some embodiments, fuel injection device 46 may also be integral with exhaust aftertreatment device 44, if desired.

Engine fuel delivery system 35 is fluidly connected to a fuel source 50 via at least one fuel supply line 55. Engine fuel delivery system 35 also includes one or more fuel injectors 65, a fuel return line 69, and at least one pump. Fuel source 50 may be configured to store an amount of fuel. Fuel supply line 55 may be disposed between fuel source 50 and fuel injectors 65, and be configured to direct fuel from fuel source 50 to fuel injectors 65. Fuel supply line 55 may direct fuel to fuel injectors 65 via individual fuel lines 66. Each fuel injector 65 may be at least partially disposed within each cylinder 22, and may be a unit type fuel injector configured to pressurize fuel and inject the pressurized fuel into each associated combustion chamber 26 of internal combustion engine 20. Fuel return line 69 may fluidly connect fuel injectors 65 to fuel source 50, and may be configured to direct surplus fuel from fuel injectors 65 to fuel source 50. It is contemplated that fuel return line 69 may include various components, such as a cooler, a check valve, a pressure regulator, etc.

Engine fuel delivery system 35 may also include a reversible pump system 70, a transfer pump 72, and a high pressure pump 73 each of which may be disposed in communication with fuel supply line 55. During a priming event, reversible pump system 70 may be configured to selectively direct fuel from fuel source 50 to through filter 78, and toward the transfer pump 72.

Conversely, during an exhaust aftertreatment event, reversible pump system 70 may also selectively direct fuel from fuel source 50 to an exhaust aftertreatment device 44 via fuel line 83. Examples of exhaust aftertreatment events requiring fuel include diesel particulate filter (DPF) regeneration, dosing systems, and selective catalyst reduction systems. Transfer pump 72 may be configured to transfer fuel from fuel source 50 to high pressure pump 73, common rail 77, and fuel injectors 65 during normal operations of internal combustion engine 20 (i.e., during operations after a startup event has been completed). Engine fuel delivery system 35 may also include filters 76 and 78 configured to clean fuel. Filters 76 and 78 may be any type of suitable filter known in the art, and may be disposed at any suitable location within fuel supply line 55, for example, downstream of transfer pump 72. It is contemplated that engine fuel delivery system 35 may include other components known in the art within fuel supply line 55, such as pressure regulators and check valves, if desired.

Figure 2:
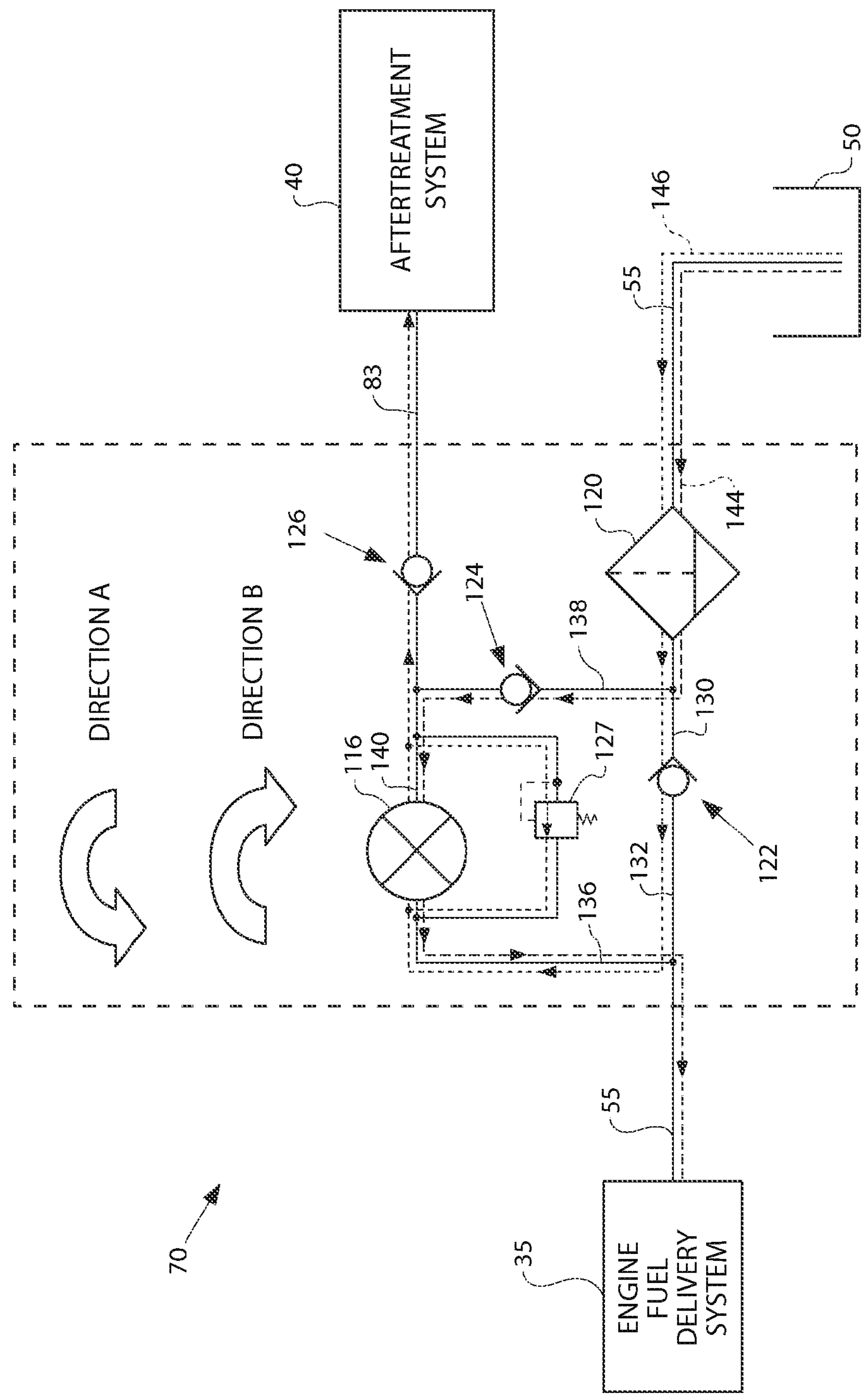
FIG. 2 is a schematic and diagrammatic illustration of an exemplary electric reversible pump system.

FIG. 2 illustrates a detailed schematic of reversible pump system 70. As previously stated, reversible pump system 70 may be used to selectively provide fuel to filter 78 and transfer pump 72 during a priming event, and toward an exhaust aftertreatment device 44 during an exhaust aftertreatment event, such as DPF regeneration. Reversible pump system 70 includes a reversible pump 116 that provides directional control for the fuel, a filter 120 that provides filtration, and a plurality of check valves 122, 124, 126, and a plurality of fuel supply lines 55, 130, 132, 136, 138, 140, and 83 as described in detail below. Check valve 122, 124, 126 may be one-way check valves such that fluid flowing through the check valve can only pass through in one direction and flow of fluid in the opposite direction is prevented. A pressure regulator 127 may be present to manage fuel pressure. Those skilled in the art will recognize that pressure regulator 127 may be a one way pressure relief valve or other similar pressure regulator. Furthermore, those skilled in the art will recognize that the pressure regulator 127 is not an essential part of the present disclosure.

In an exemplary embodiment, the reversible pump 116 is an electric pump including a direct current (DC) motor that can be operated in a first rotational direction and in a second, opposite rotational direction. The first rotational direction corresponds to the arrow in FIG. 2 labeled “Direction A” and the second rotational direction corresponds to the arrow in FIG. 2 labeled “Direction B”. Each rotational operational direction of the motor corresponds to a direction of flow of fuel through the reversible pump 116, as described below. Even though described throughout ad including a DC motor, the reversible pump may include any other mechanism that provides opposite rotational directions for operating the reversible pump 116.

When the reversible pump 116 is operated in Direction A, the fuel within the reversible pump system 70 generally follows a dashed-line fuel path 144 and flows through the reversible pump 116 from right to left as shown in FIG. 2. During an engine priming event, to rotation of the motor in the reversible pump 116 flows in Direction A. The rotation of the motor in the reversible pump 116 in Direction A draws from the fuel source 50 toward the reversible pump 116 and out of the reversible pump system 70 toward the engine fuel delivery system 35 in the following manner. The fuel exits the fuel source 50 via fuel supply line 55 and is routed through filter 120. The fuel is then routed to the check valve 124 via fuel supply line 138. The rotation of the reversible pump 116 draws the fuel through check valve 124, down fuel supply line 140, at which point the fuel enters reversible pump 116. Reversible pump 116 then pumps the fuel into fuel supply line 136 wherein the fuel exits the reversible pump system 70. The fuel that exits the reversible pump system 70 is prevented from being routed back to the fuel source via fuel supply line 132 by check valve 122, and (if present) by pressure regulator 127 when it is in the closed position.

When the reversible pump 116 is operated in Direction B, the fuel from fuel source 50 is delivered to the reversible pump system 70 generally follows a dotted-line fuel path 146 and flows through the reversible pump 116 from a left to right direction as shown in FIG. 2. The rotation of the motor in the reversible pump 116 in Direction B draws fuel from fuel source 50 toward the reversible pump 116 and out of the reversible pump system 70, wherein fuel may be delivered to an exhaust aftertreatment system, such as a DPF and fuel-fired burner. When reversible pump 116 is operated in Direction B, the fuel flows in the following manner. Fuel exits the fuel source 50 via fuel supply line 55 and is routed through filter 120. The fuel is then routed to and through check valve 122, wherein it continues through fuel supply lines 132 and 136 toward reversible pump 116. The fuel then enters and exits reversible pump 116, wherein it is delivered to and through check valve 126 via fuel supply line 140. Upon going through check valve 126, the fuel is then delivered out of the reversible pump system 70 via fuel line 83. At this point the fuel may be delivered to an exhaust aftertreatment system such as the one shown in FIG. 1. The reversible pump's 116 fuel delivery may be more than the required fuel for the exhaust aftertreatment system 40. If this happens, extra fuel delivered to the inlet of reversible pump 116 may be routed away from reversible pump 116 via a pressure regulator 127. When reversible pump is operated in Direction B, check valves 126 and 124 prevent fuel from being returned back to the fuel source 50.

Those skilled in the art will recognize that while the reversible pump system 70 is shown as selectively delivering fuel to engine fuel delivery system and to an exhaust aftertreatment system, the reversible pump system 70 could also be configured to selectively deliver any fluid from a common source to any two separate systems or locations for myriad purposes, without parting from the scope and spirit of this disclosure.

INDUSTRIAL APPLICABILITY

The fuel delivery system of the present disclosure has wide application in a variety of engine types including, for example, diesel engines, gasoline engines, and gaseous fuel-powered engines. The disclosed fuel delivery system may separately deliver fuel to an engine for combustion through a transfer pump, and for priming and exhaust aftertreatment through a reversible electric pump system. In this manner, fuel delivery to an engine for combustion purposes may be substantially unaffected by fuel delivery unaffected by fuel delivery to the exhaust treatment device, and vice versa. As a result, the disclosed fuel delivery system may provide fuel to multiple systems in an efficient and cost-effective manner.

In operation, an electronic control module (ECM) or other controller associated with the engine provides a control signal to the reversible pump 116. When fuel is required for the engine fuel delivery system 35, the ECM provides a control signal to the reversible pump 116, such that the motor of the reversible pump 116 is operated in Direction A. When fuel is required for the exhaust aftertreatment system 40, the ECM provides a control signal to the reversible pump 116, such that the motor of the reversible pump is operated in Direction B. An operator of a machine employing the engine may indicate to the ECM a desired fuel path via switches provided on the machine. Alternatively, the engine ECM may independently determine when to activate and/or reverse the operational direction of the motor of the reversible pump 116.

It will be apparent to those skilled in the art that various modifications and variations can be made to the disclosed fuel system without departing from the scope of the disclosure. Other embodiments of the fuel system will be apparent to those skilled in the art from consideration of the specification and practice of the system disclosed herein. It is intended that the specification and examples be considered as exemplary only, with a true scope of the disclosure being indicated by the following claims and their equivalents.

We claim:

1. A system for delivering fluid from a common source to multiple locations, comprising:
- a fluid source;
- a pump associated with the fluid source, the pump operable in a first state to pump fluid from the fluid source to a first location; and the pump operable in a second state to pump fluid from the fluid source to a second location, wherein the first state corresponds to a first rotational direction of the pump, and the second state corresponds to a second rotational direction of the pump; and
- wherein the location is an engine fuel delivery system, and the second location is an exhaust aftertreatment system.

2. The system of claim 1, wherein the pump is a reversible electric pump having a direct-current motor.

3. The system of claim 1, further including:
- a filter;
- a first check valve;
- a second check valve; and
- a third check valve.

4. The system of claim 3, wherein the fluid source, the filter, the first check valve, the pump and the first location are arranged serially and sequentially.

5. The system of claim 4, wherein the fluid source, the filter, the second check valve, the pump, the third check valve and the second location are arranged serially and sequentially.

6. The system of claim 5, wherein the first check valve, the second check valve and the third check valve are arranged such that when the pump is operated in the first state, fluid is delivered from the fluid source to the first location and blocked to the second location; and when the pump is operated in the second state, fluid is delivered from the fluid source to the second location and blocked to the first location.

7. The system of claim 6, wherein the fluid is fuel.

8. A system for delivering fluid from a common source to multiple locations, comprising:
- a fluid source;
- pump associated with the fluid source, the pump operable in a first state to pump fluid from the fluid source to a location; and the pump operable in a second state to pump fluid from the fluid source to a second location, wherein the first state corresponds to a first rotational direction of the pump, and the second state corresponds to a second rotational direction of the pump;
- filter;
- a first check valve,
- a second check valve;
- a third check valve;
- wherein the fluid source, the filter, the first check valve, the pump and the first location are arranged serially and sequentially;
- wherein the fluid source, the filter, the second check valve, the pump, the third check valve and the second location are arranged serially and sequentially;
- wherein the first check valve, the second check valve and the third check valve are arranged such that when the pump is operated in the first state, fluid is delivered from the fluid source to the first location and blocked to the second location; and when the pump is operated in the second state, fluid is delivered from the fluid source to the second location and blocked to the first location;

wherein the fluid is fuel; and wherein the first location is an engine fuel delivery system, and the second location is an exhaust aftertreatment system.

9. A method of selectively providing fuel to an engine fuel delivery system and to an exhaust aftertreatment system, the method comprising the steps of:

providing a reversible pump associated with the engine fuel delivery system and the exhaust aftertreatment system;

providing a fuel source fluidly connected to the reversible pump;

drawing fuel from the fuel source to the reversible pump; and selectively directing fuel from the pump to the engine fuel delivery system when the reversibly pump is operated in a first direction and to the exhaust aftertreatment system when the reversible pump is operated in a second direction.

10. The method of claim 9, wherein the drawing step includes filtering the fuel.

11. The method of claim 10, wherein when the reversible pump is being operated in the first direction, the selectively directing step further includes the sequential steps of filtering the fuel, routing the fuel through a first check valve, routing the fuel through the reversible pump, and directing the fuel to the engine fuel delivery system.

12. The method of claim 11, wherein when the reversible pump is being operated in the second direction, the selectively directing step further includes the sequential steps of filtering the fuel, routing the fuel through a second check valve, routing the fuel through the reversible pump, routing the fuel through a third check valve, and directing the fuel to the exhaust aftertreatment system.

13. The method of claim 12, wherein the first check valve, the second check valve, and the third check valve are arranged such that when the reversible pump is operated in the first direction, fuel is directed to the engine fuel delivery system and blocked from the exhaust aftertreatment system; and when the reversible pump is operated in the second direction, fuel is directed to the exhaust aftertreatment system and blocked from the engine fuel delivery system.

14. A machine comprising:

an engine configured to generate a power output;

an exhaust aftertreatment system associated with the engine; and a fuel delivery system configured to selectively provide fuel to the engine and the exhaust aftertreatment system, the fuel system comprising:

a fuel source; and a pump associated with the fuel source, the pump being operable in a first state to pump fuel from the fuel source to the engine, and the pump being operable in a second state to pump fuel from the fuel source to the regeneration system, wherein the first state corresponds to a first rotational direction of the pump and the second state corresponds to a second rotational direction of the pump.

15. The machine of claim 14, wherein the pump is a reversible electric pump having a direct current motor.

16. The machine of claim 15, further including:

a filter;

a first check valve;

a second check valve; and a third check valve.

17. The machine of claim 16, wherein the fuel source, the filter, the first check valve, the pump and the first location are arranged serially and sequentially.

18. The machine of claim 17, wherein the fuel source, the filter, the second check valve, the pump, the third check valve and the second location are arranged serially and sequentially.

19. The machine of claim 18, wherein the first check valve, the second check valve and the third check valve are arranged such that when the pump is operated in the first state, fuel is delivered from the fuel source to the engine and blocked to exhaust aftertreatment system; and when the pump is operated in the second state, fuel is delivered from the fuel source to the exhaust aftertreatment system and blocked to the engine.

* * * * *

UNITED STATES PATENT AND TRADEMARK OFFICE

CERTIFICATE OF CORRECTION

PATENT NO. : 8,312,863 B2
APPLICATION NO. : 12/722208
DATED : November 20, 2012
INVENTOR(S) : Ibrahim et al.

It is certified that error appears in the above-identified patent and that said Letters Patent is hereby corrected as shown below:

In the Claims

Column 6, line 21, in Claim 1, delete “the location” and insert -- the first location --.

Column 6, line 47, in Claim 8, delete “pump” and insert -- a pump --.

Column 6, line 49, in Claim 8, delete “location;” and insert -- first location; --.

Column 6, line 54, in Claim 8, delete “filter;” and insert -- a filter; --.

Column 6, line 55, in Claim 8, delete “valve,” and insert -- valve; --.

Signed and Sealed this
Eleventh Day of August, 2015

Michelle K. Lee

Michelle K. Lee
*Director of the United States Patent and Trademark Office*